United States Patent
Lee et al.

(10) Patent No.: US 8,056,061 B2
(45) Date of Patent: Nov. 8, 2011

(54) DATA PROCESSING DEVICE AND METHOD USING PREDESIGNATED REGISTER

(75) Inventors: Sang-gyu Lee, Seoul (KR); Chong-mok Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1100 days.

(21) Appl. No.: 11/253,684

(22) Filed: Oct. 20, 2005

(65) Prior Publication Data

US 2006/0101437 A1    May 11, 2006

(30) Foreign Application Priority Data

Oct. 21, 2004  (KR) .................. 10-2004-0084406

(51) Int. Cl.
*G06F 9/44* (2006.01)
(52) U.S. Cl. ........ 717/136; 717/137; 717/138; 717/140; 717/148; 717/151; 717/153; 712/E9.001; 712/E9.003; 712/E9.016; 712/E9.035; 712/E9.037
(58) Field of Classification Search .......... 717/136–167; 712/E9.001, E9.003, E9.016, E9.035, E9.037; 718/1

See application file for complete search history.

(56) References Cited

U.S. PATENT DOCUMENTS

| | | | | |
|---|---|---|---|---|
| 5,202,975 | A | * | 4/1993 | Rasbold et al. ............... 717/151 |
| 5,274,820 | A | * | 12/1993 | Gillet ............................ 717/139 |
| 6,110,226 | A | | 8/2000 | Bothner |
| 6,151,618 | A | * | 11/2000 | Wahbe et al. ..................... 718/1 |
| 2004/0006687 | A1 | * | 1/2004 | Yoshida ........................ 712/220 |
| 2006/0158354 | A1 | * | 7/2006 | Aberg et al. .................... 341/50 |

FOREIGN PATENT DOCUMENTS

| | | |
|---|---|---|
| JP | 2002-073345 A | 3/2002 |
| JP | 2003-167737 A | 6/2003 |
| KR | 2001-0104687 A | 11/2001 |
| KR | 2002-0085872 A | 11/2002 |
| KR | 2003-0036876 A | 5/2003 |
| KR | 10-2004-0034620 A | 4/2004 |

OTHER PUBLICATIONS

Andreas Krell, "Efficient JavaVM Just-in-Time Compilation", Oct. 12-18, 1998, Parallel Architectures and Compilation Techniques, 1998. Proceedings. 1998 International Conference, p. 205-212.*

* cited by examiner

*Primary Examiner* — Wei Zhen
*Assistant Examiner* — Phillip Nguyen
(74) *Attorney, Agent, or Firm* — Sughrue Mion, PLLC

(57) ABSTRACT

A data processing device and method are provided. The data processing device includes a code storage unit storing an original code to be translated into a machine language code, a code analyzer analyzing the original code stored in the code storage unit, a register allocator allocating a predesignated register for a command included in the original code based on the result of analysis, and a code executor executing a machine language code generated using the allocated register.

8 Claims, 5 Drawing Sheets

DATA PROCESSING DEVICE AND METHOD USING PREDESIGNATED REGISTER

CROSS-REFERENCE TO RELATED APPLICATION

This application claims priority from Korean Patent Application No. 10-2004-0084406 filed on Oct. 21, 2004 in the Korean Intellectual Property Office, the disclosure of which is incorporated herein by reference in its entirety.

BACKGROUND OF THE INVENTION

1. Field of the Invention

The present invention relates to a data processing device and method, and more particularly, to a data processing device and method capable of minimizing compiling time.

2. Description of the Related Art

In the field of computers, a virtual machine is a term used by Sun Microsystems, Inc., a developer of the JAVA (a registered trademark of Sun Microsystems, Inc.) language and the execution environment therefor, and is software serving as an interface between a compiled JAVA binary code and a microprocessor (or a hardware platform) actually executing a command of a program. When a JAVA virtual machine is provided on a single platform, any JAVA program called a bytecode can be executed on the platform. JAVA is designed to allow application programs to be executed on any platform without having to be reconstructed or compiled in conformity with the platform.

JAVA programming languages have proliferated rapidly since they were published in the middle of 1990's but were disadvantageous in that their codes have a slow operating speed compared to the codes composed by other programming languages such as C or C++. In order to overcome this disadvantage, two techniques applicable to a conventional interpreter-based JAVA virtual machine have been previously proposed: one is a dynamic code generation technique such as a Just-In-Time (JIT) compiler and the other is a static code generation technique such as an Ahead-Of-Time (AOT) compiler.

The JAVA platform basically comprises a JAVA virtual machine and JAVA classes. Class files are composed of information associated with data structures of the classes, including field information, method information, and so on. Execution codes of a method are formed of the bytecode, independent of hardware or an operating system.

As shown in FIG. 1, such JAVA virtual machine includes a JAVA virtual machine runtime 10, an operating system layer 20, a hardware layer 30, a class loader 40, an execution engine 50 and a garbage collector 60. The virtual machine runtime manages necessary resources such as memory, threads, and networks using interface with lower layers, i.e., the operating system layer 20 and the hardware layer 30. The class loader 40 converts a class corresponding to a program module written in JAVA into a form that can be executed by the JAVA virtual machine and loads the converted class onto memory. The execution engine 50 executes an execution code of a JAVA class. The garbage collector 60 collects unnecessary memories among memories used during the execution of an application and returns them to the JAVA virtual machine runtime 10 to be reused.

On the basis of the execution engine, the conventional JAVA virtual machine can be classified into an interpreter-based JAVA virtual machine, a JIT compiler-based JAVA virtual machine, a JAVA virtual machine using the interpreter-based and JIT compiler-based JAVA virtual machines, an AOT compiler-based JAVA virtual machine, and so on.

The interpreter-based JAVA virtual machine interprets the bytecodes of the method intended for execution one by one, thereby performing an application.

The JIT compiler obtains a machine language code dependent on the current JAVA platform by compiling the bytecodes, and then executes the machine language code to conduct an application.

Although the JIT compiler provides better performance than the interpreting method, compiling time is included in application execution time since compiling is performed at a method execution time. To overcome this disadvantage, an AOT compiler performs compiling before the application execution begins because compiling time is regarded as part of the method execution time.

FIG. 2 illustrates a method of translating a bytecode into a machine language code using a compiler.

In operation S10, the compiler analyzes the bytecode and collects data needed to generate the machine language code. Here, the data needed to generate the machine language code includes a type of command obtained by analyzing the bytecode and a use frequency of the command.

In operation S20, the compiler allocates a register for the command based on the collected data. In operation S30, the compiler generates the machine language code.

In operation S40, the machine language code is recorded in predetermined memory and then is executed.

When the compiler generating the machine language code as described above, compile performance is greatly influenced by the manner of allocating a register on which an operation is performed fastest within a processor.

In detail, local register allocation or global register allocation is performed according to a type of command. The local register allocation is performed in units of basic blocks while the global register allocation is performed in units of methods.

In other words, a register is allocated for a basic block in the local register allocation and is allocated for a method in the global register allocation.

A command for loading onto a register and a command for moving to a memory must be respectively added to the front and the back of each of the basic block and the method. Accordingly, performance is decreased with respect to a stack slot beyond a register allocation unit, i.e., the basic block or the method when the local register allocation or the global register allocation is used.

Korean Patent Publication No. 2001-0104687 discloses a hardware JAVA accelerator which implements a part of a JAVA virtual machine in hardware to accelerate system operations related with JAVA bytecodes. The disclosed hardware JAVA accelerator accelerates an operating speed but does not prevent performance from decreasing with respect to a stack slot beyond a register allocation unit, i.e., a basic block or a method during compiling.

SUMMARY OF THE INVENTION

The present invention provides a data processing device and method, by which register allocation is omitted from a compiling procedure performed to generate a machine language code, thereby minimizing compiling time.

According to an aspect of the present invention, there is provided a data processing device including a code storage unit storing an original code to be translated into a machine language code, a code analyzer analyzing the original code stored in the code storage unit, a register allocator allocating a predesignated register for a command included in the original code based on the result of analysis, and a code executor executing a machine language code generated using the allocated register.

According to another aspect of the present invention, there is provided a data processing method including analyzing an original code to be translated into a machine language code, allocating a predesignated register for a command included in the original code based on the result of analysis, and executing a machine language code generated using the allocated register.

BRIEF DESCRIPTION OF THE DRAWINGS

The above and/or other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
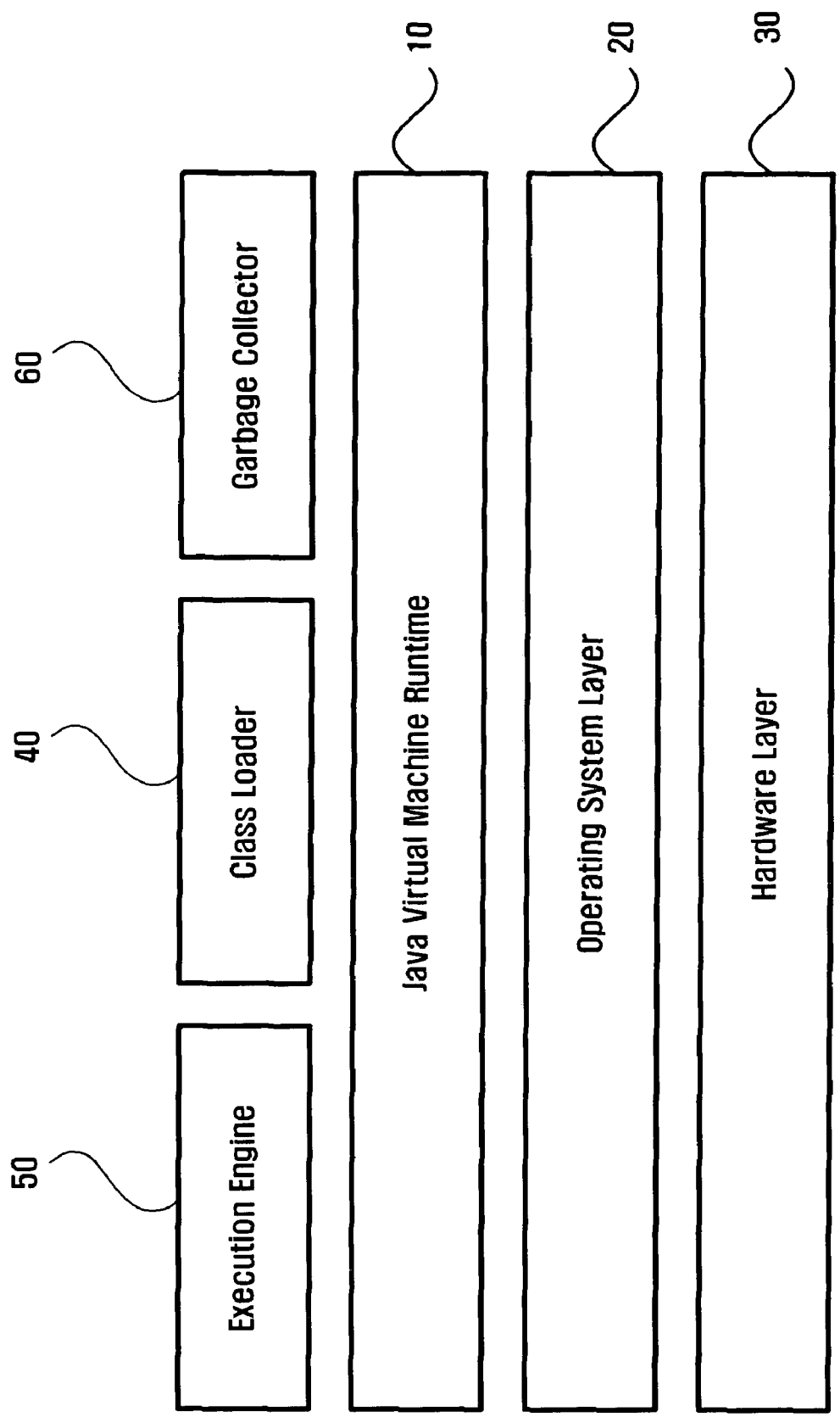
FIG. 1 illustrates a conventional virtual machine.
Figure 2:
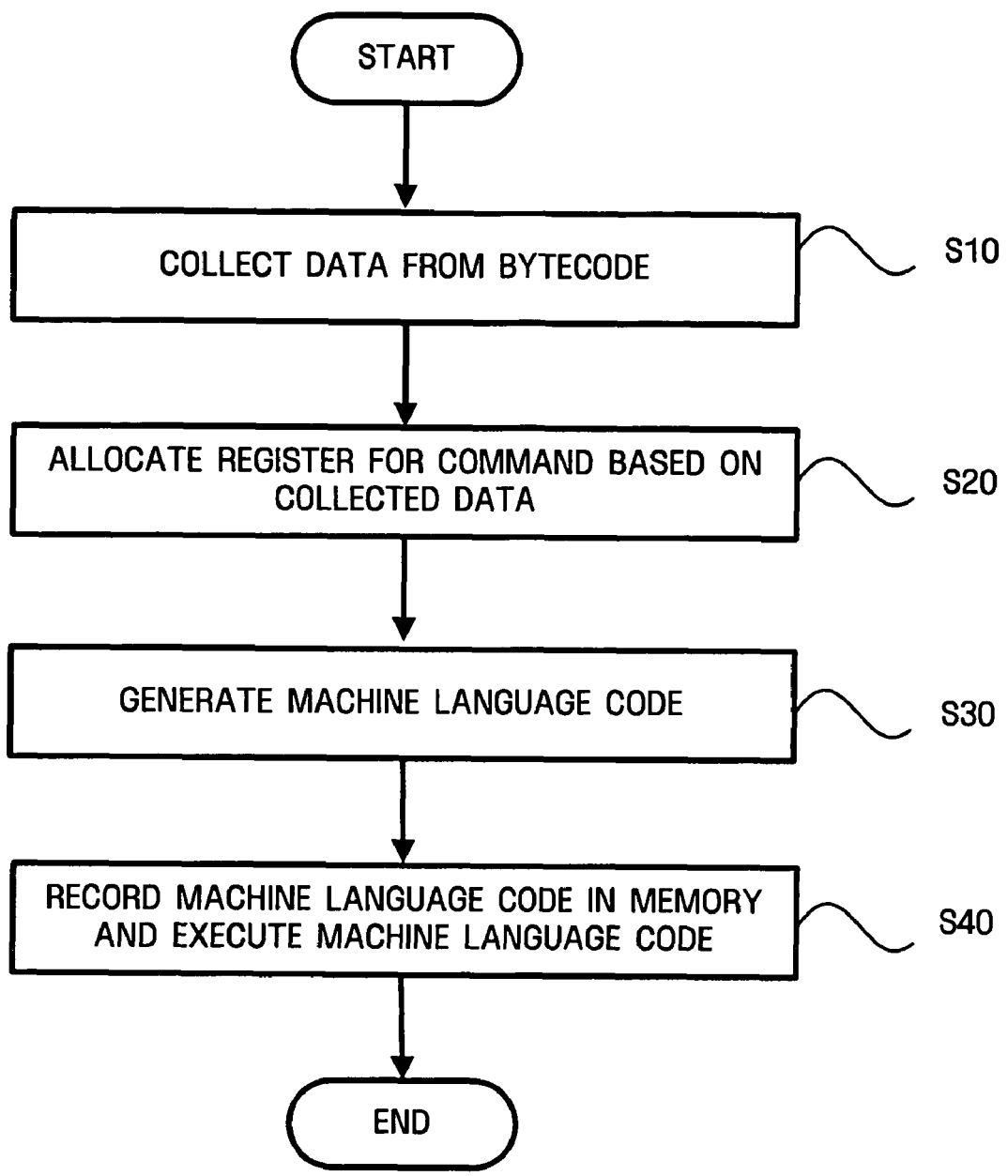
FIG. 2 is a flowchart of a conventional method of translating a bytecode into a machine language code using a compiler.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings, in which exemplary embodiments of the invention are shown.

Figure 3:
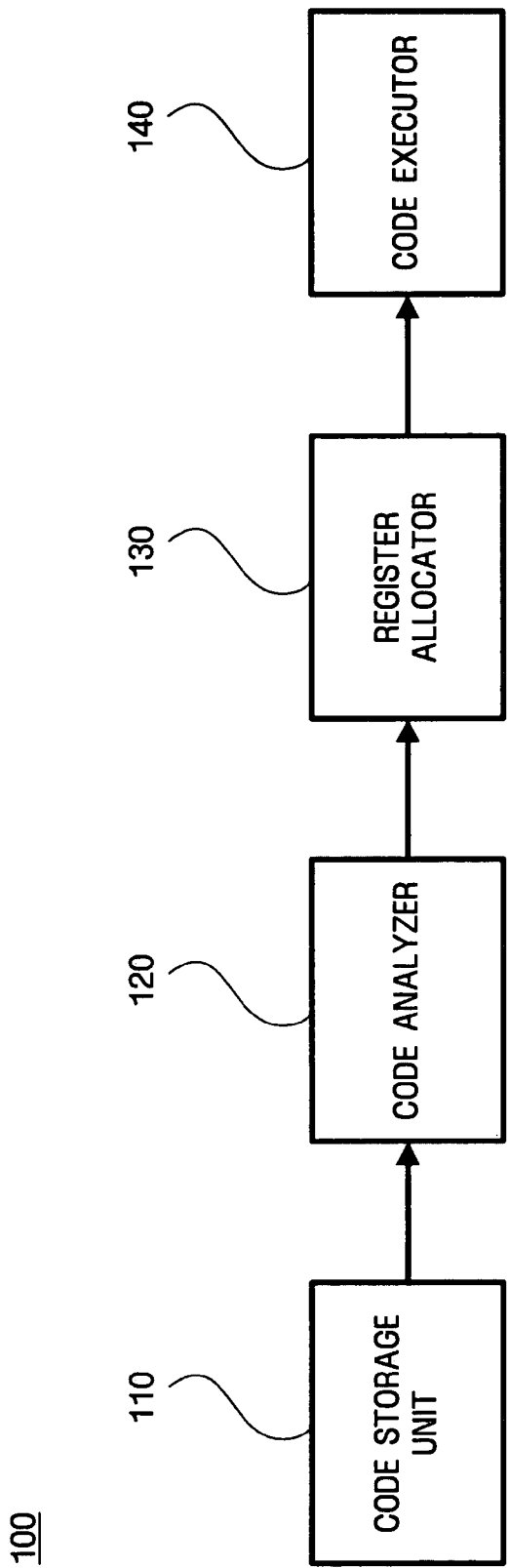
FIG. 3 illustrates a data processing device according to an exemplary embodiment of the present invention.

FIG. 3 illustrates a data processing device 100 according to an exemplary embodiment of the present invention.

The data processing device 100 includes a code storage unit 110 storing an original code to be translated into a machine language code, a code analyzer 120 analyzing the original code, a register allocator 130 allocating a predesignated register according to an analyzed variable, and a code executor 140 executing a machine language code generated using the register.

In exemplary embodiments of the present invention, it is assumed that an original code to be translated into a machine language code is a bytecode in which a JAVA program is compiled by a JAVA virtual machine. In addition, it is assumed that the bytecode is translated into a machine language code by a JIT compiler among existing compilers. However, the present invention is not restricted thereto, and an interpreting compiler or an AOT compiler may be used.

Here, the JAVA virtual machine is a stack machine. An operation is performed in a top space of an operand stack. A slot in the operand stack is referred to as a stack slot. The JAVA virtual machine piles operands of an operation to be executed up on the operand stack and extracts an operand from the operand stack to execute the operation and loads the result of the operation onto a top stack slot of the operand stack.

Meanwhile, a JAVA compiler allocates a register existing within a microprocessor for operands loaded on the operand stack in order to execute a bytecode generated by the JAVA virtual machine.

Generally, a register allocated for operands can be divided into two types according to a bytecode unit analyzed for register allocation.

Firstly, when a bytecode is analyzed in units of basic blocks, consecutive commands in a set are analyzed at one time so that once the first command is executed, execution is continued to the last command. Here, since a branch command does not exist until all commands in the set are executed, the set of commands facilitates analysis, and therefore, local register allocation is used.

However, when the bytecode is analyzed in units of methods, a conditional or branch command exists among consecutive commands. Accordingly, it is necessary to detect a complicated program flow, and therefore, global register allocation is used.

When the local or global register allocation is used, time for bytecode analysis and register allocation is added to bytecode compiling time. As a result, time for application execution increases.

Accordingly, the register allocator 130 may allocate a single register for a single stack slot of an operand stack when a bytecode is analyzed using the code analyzer 120. In detail, a register for a stack slot of the operand stack is predesignated so that register allocation and machine language generation can be accomplished simultaneously when the bytecode is analyzed.

In other words, the register allocator 130 allocates a predesignated register for a command obtained through the bytecode analysis. Accordingly, time for the register allocator 130 to allocate a register is not included in time for the JAVA compiler to translate the original code into the machine language code.

Conventionally, when the original code is translated into the machine language code, the entire original code is analyzed and classified according to existence or non-existence of interference of a command, and a register is allocated. However, in an exemplary embodiment of the present invention, the machine language code is immediately generated using a predesignated register, and therefore, compiling time is reduced.

Meanwhile, the register allocator 130 may compare a maximum height of a stack with the number of available registers before allocating registers. Here, when more stack slots than the number of available registers are used, compiling is abandoned and all processes related to register allocation for commands are omitted. As a result, decrease of compile performance can be prevented.

Since 96% of methods of an EEMBC benchmark used to measure the performance of a JAVA virtual machine of an embedded system use five or less stack slots, the decrease of performance caused by the maximum height of an operand stack that is beyond the number of available registers is not much, and therefore, the abandonment of compiling is possible.

In addition, the register allocator 130 calculates a basic block and the height of the stack of commands at the beginning of the basic block. It cannot be seen from a bytecode in a JAVA program what slot in the stack should be brought from what height. The height of the stack can be detected by reading all reachable commands starting from a function start point and simulating the change in the stack height occurring due to the commands.

After the stack height is calculated, the register allocator 130 can allocate a register based on predesignated one-to-one correspondence between a stack slot and a register. Since a register has already been allocated for a stack slot, the code executor 140 can immediately generate a machine language code. Accordingly, a read command for moving from a memory to a register and a write command for moving from the register to the memory, which are conventionally used whenever an operation is performed to generate a machine language code, can be omitted.

A method of allocating a register using the above-described data processing device 100 will now be described.

Figure 4:
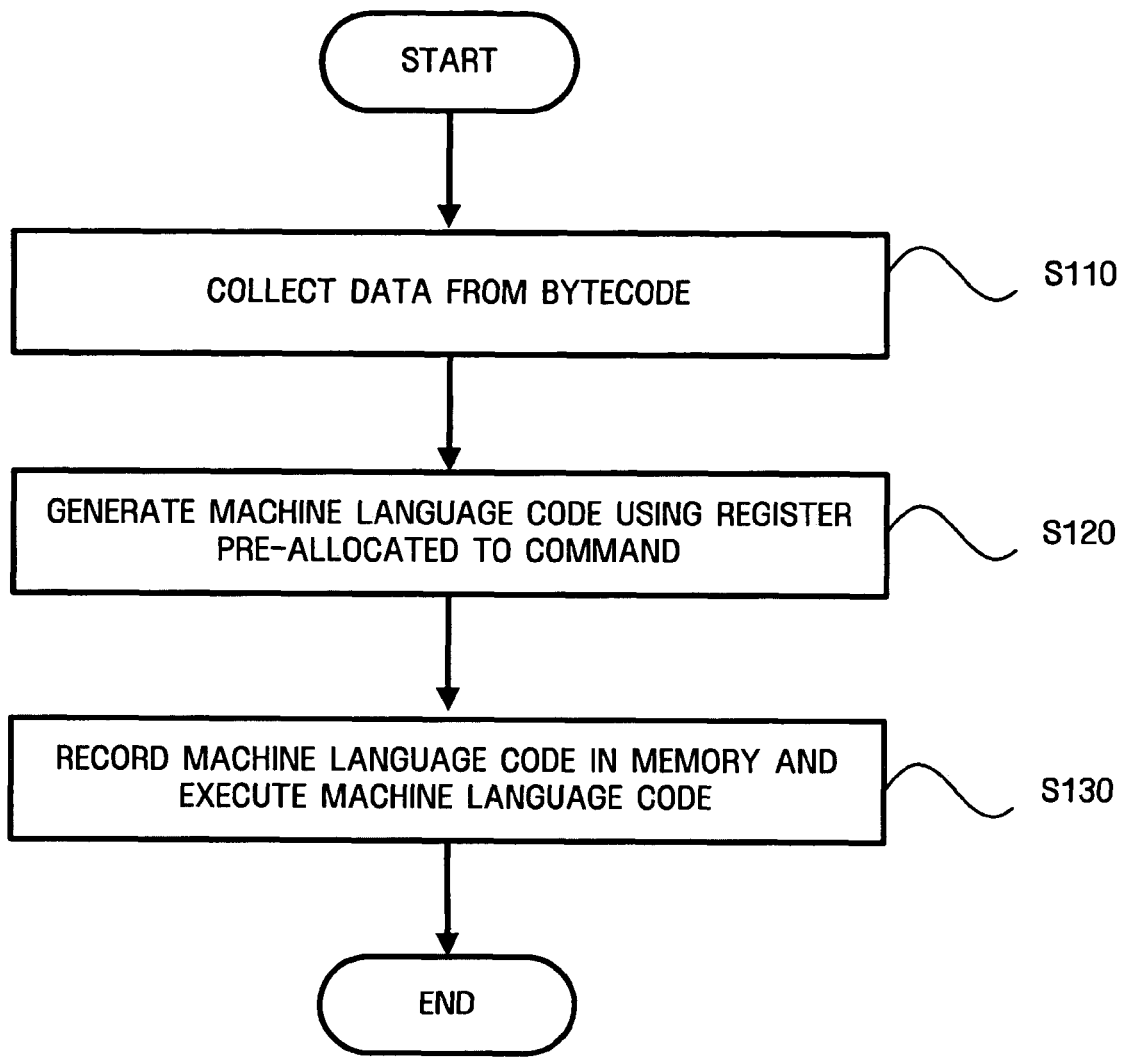
FIG. 4 is a flowchart of a data processing method according to an exemplary embodiment of the present invention.

FIG. 4 is a flowchart of a data processing method using the data processing device 100, according to an exemplary embodiment of the present invention.

Referring to FIG. 4, in operation S110 the code analyzer 120 analyzes an original code stored in the code storage unit 110 and collect data needed to generate a machine language code.

The data collected by the code analyzer 120 may include a type of each of commands included in the original code, e.g., a byte code, and a use frequency of each command.

After collecting the data on the original code is completed by the code analyzer 120, the register allocator 130 allocates a predesignated register in a processor for each command and simultaneously the code executor 140 generates a machine language code in operation S120.

Here, a register allocated by the register allocator 130 has already been designated for each command, and therefore, the code executor 140 can generate the machine language code simultaneously when the register allocation is performed by the register allocator 130.

In detail, conventionally, the entire bytecode is analyzed to classify commands into local variables and stack variables. Next, a register is allocated using global register allocation or local register allocation According to the result of the classification and the machine language code is generated. In an exemplary embodiment of the present invention, however, the machine language code can be generated at the same time when a register is allocated for a command. Since a register allocated for a command is predesignated in the exemplary embodiment of the present invention, code read and write performed between a memory and a register can be omitted.

Thereafter, in operation S130 the code executor 140 records the machine language code in a predetermined memory and executes the machine language code.

Figure 5:
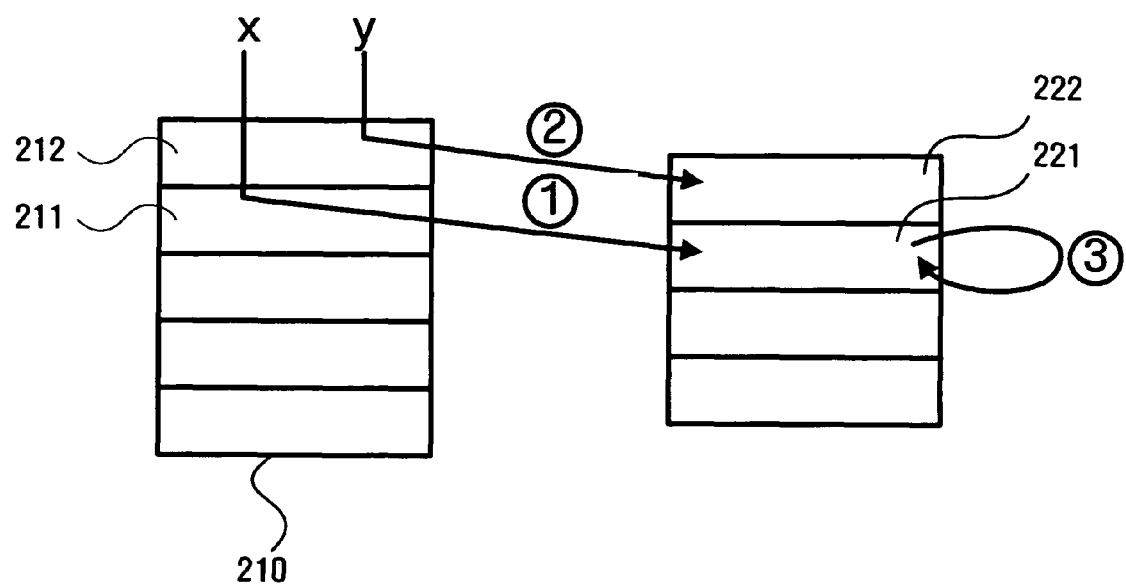
FIG. 5 illustrates an operation process performed using a data processing device and method in an exemplary embodiment of the present invention.

FIG. 5 illustrates an operation process performed using a data processing device and method in an exemplary embodiment of the present invention.

When an operation "x=x+y" is compiled and "x" uses a stack slot 211 of an operand stack 210 at an execution time point, a code may be generated to use a register 221 pre-allocated for the stack slot 211 (operation ①). When "y" uses a stack slot 212 of the operand stack 210 at the execution point, a code may be generated to use a register 222 pre-allocated for the stack slot 212 (operation ②).

When the result of performing "x+y" uses the stack slot 211 of the operand stack 210, a code may be generated to use the register 221 pre-allocated for the stack slot 211 (operation ③).

Thereafter, when the operation "x=x+y" is performed, the operand stack 210 in memory space is not used, but only operations ①, ②, and ③ are performed using registers allocated during the compiling.

When a register is not allocated for a command in advance, time for register allocation is included in time for generating and executing a machine language code, and therefore, entire compiling time increases. However, in an exemplary embodiment of the present invention, since registers for "x" and "y" are predesignated in advance, time for register allocation is not included in compiling time. As a result, the compiling time is reduced.

As described above, according to the present invention, register allocation is performed before compiling, and therefore, compiling time is reduced when a machine language code is generated using a compiler.

Although the present invention has been described in connection with the exemplary embodiments of the present invention, it will be apparent to those skilled in the art that various modifications and changes may be made thereto without departing from the scope and spirit of the invention.

What is claimed is:

1. A data processing device comprising:
   a processor comprising:
   a code storage unit which stores an original code to be translated into a machine language code;
   a code analyzer which analyzes the original code stored in the code storage unit;
   a register allocator which allocates a predesignated register to each stack slot of an operand stack of Java virtual machine for all of an original code, based on a result of the analysis by the code analyzer; and
   a code executor which generates a machine language code for all of the original code using the register allocated by the register allocator, and
   wherein the allocating the predesignated register and the generating the machine language code are performed at a same period of time; and
   wherein a time for the register allocator to allocate the predesignated register is not included in a time for the data processing device to translate the original code into the machine language code.

2. The data processing device of claim 1, wherein the machine language code is generated using at least one of a Just-In-Time compiler, an interpreter compiler, and an Ahead-Of-Time compiler.

3. The data processing device of claim 2, wherein the original code is a bytecode.

4. A data processing method comprising:
   analyzing an original code to be translated into a machine language code;
   allocating a predesignated register to each stack slot of an operand stack of Java virtual machine for all of an original code based on a result of analyzing; and
   generating a machine language code for all of the original code using the predesignated register which is allocated, and
   wherein the allocating the predesignated register and the generating the machine language code are performed at a same period of time; and wherein a time for allocating the predesignated register is not included in a time for the data processing method to translate the original code into the machine language code.

5. The data processing method of claim 4, wherein the executing of the machine language code comprises generating the machine language code using at least one of a Just-In-Time compiler, an interpreter compiler, and an Ahead-Of-Time compiler.

6. The data processing method of claim 5, wherein the original code is a bytecode.

7. The data processing device of claim 1, wherein the machine language code is generated using at least one of an interpreter compiler and an Ahead-Of-Time compiler.

8. The data processing device of claim 1, wherein registers are preallocated for each command of an operation and wherein the preallocated registers are used during compiling.

* * * * *